United States Patent Office 3,353,152
Patented Nov. 14, 1967

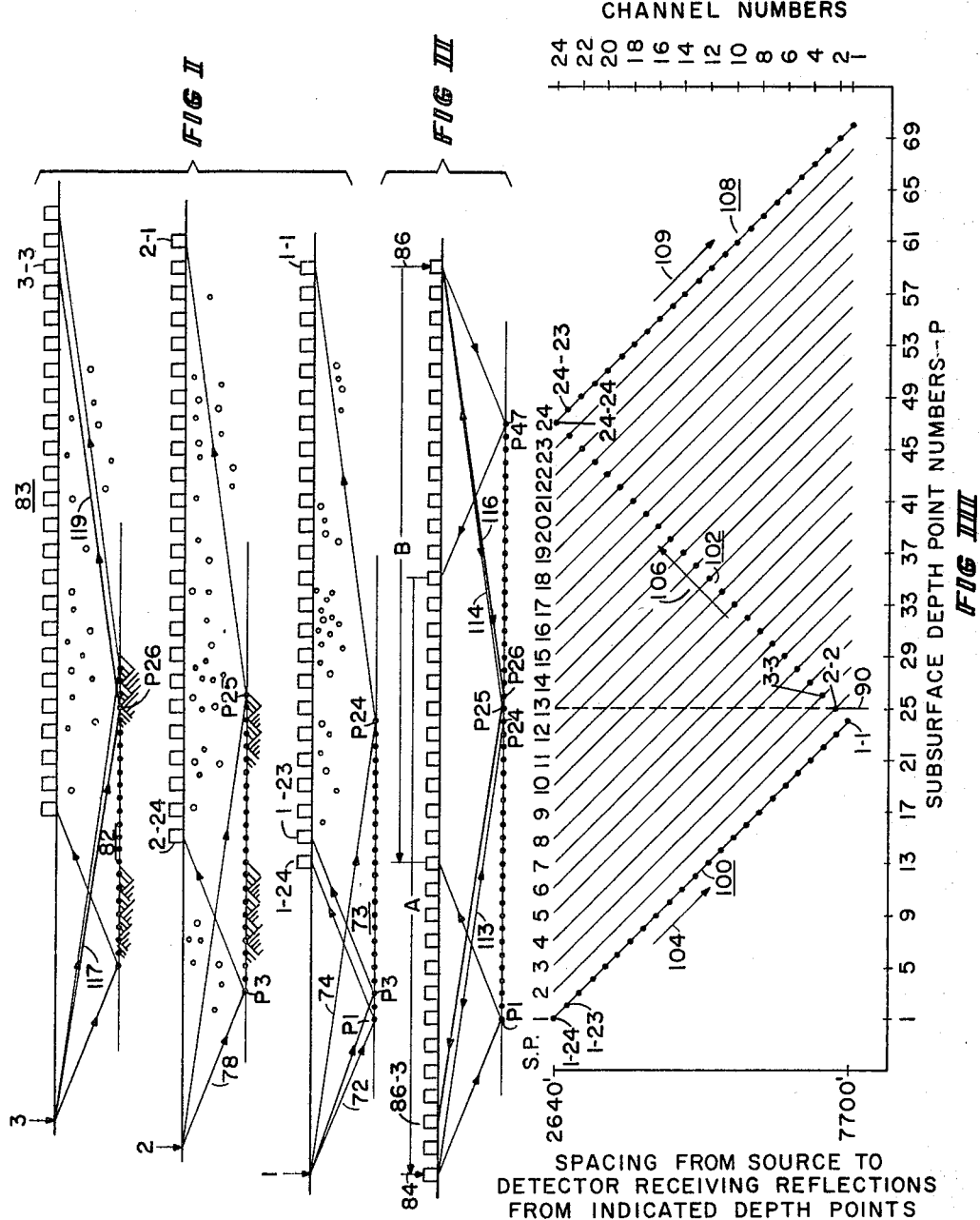

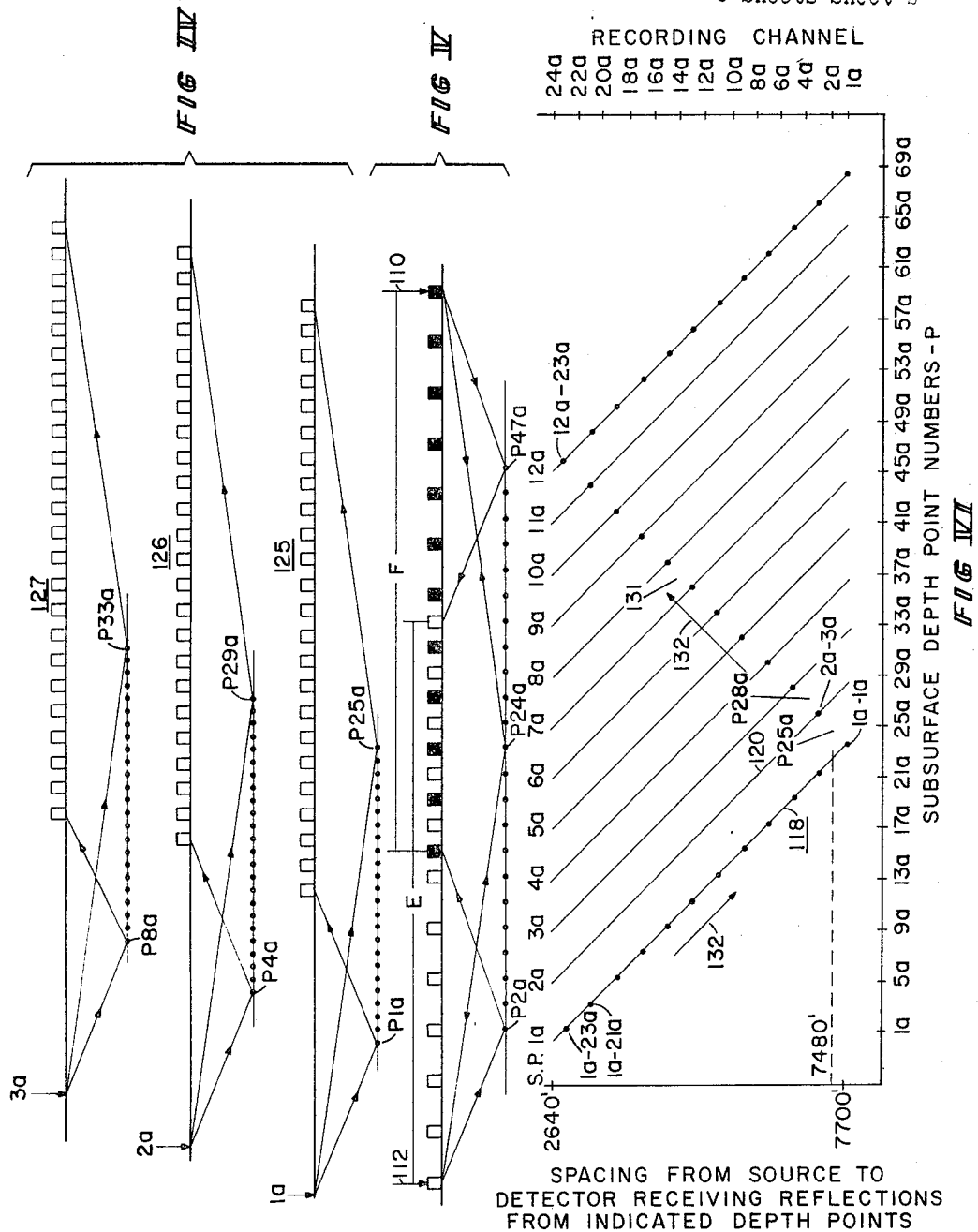

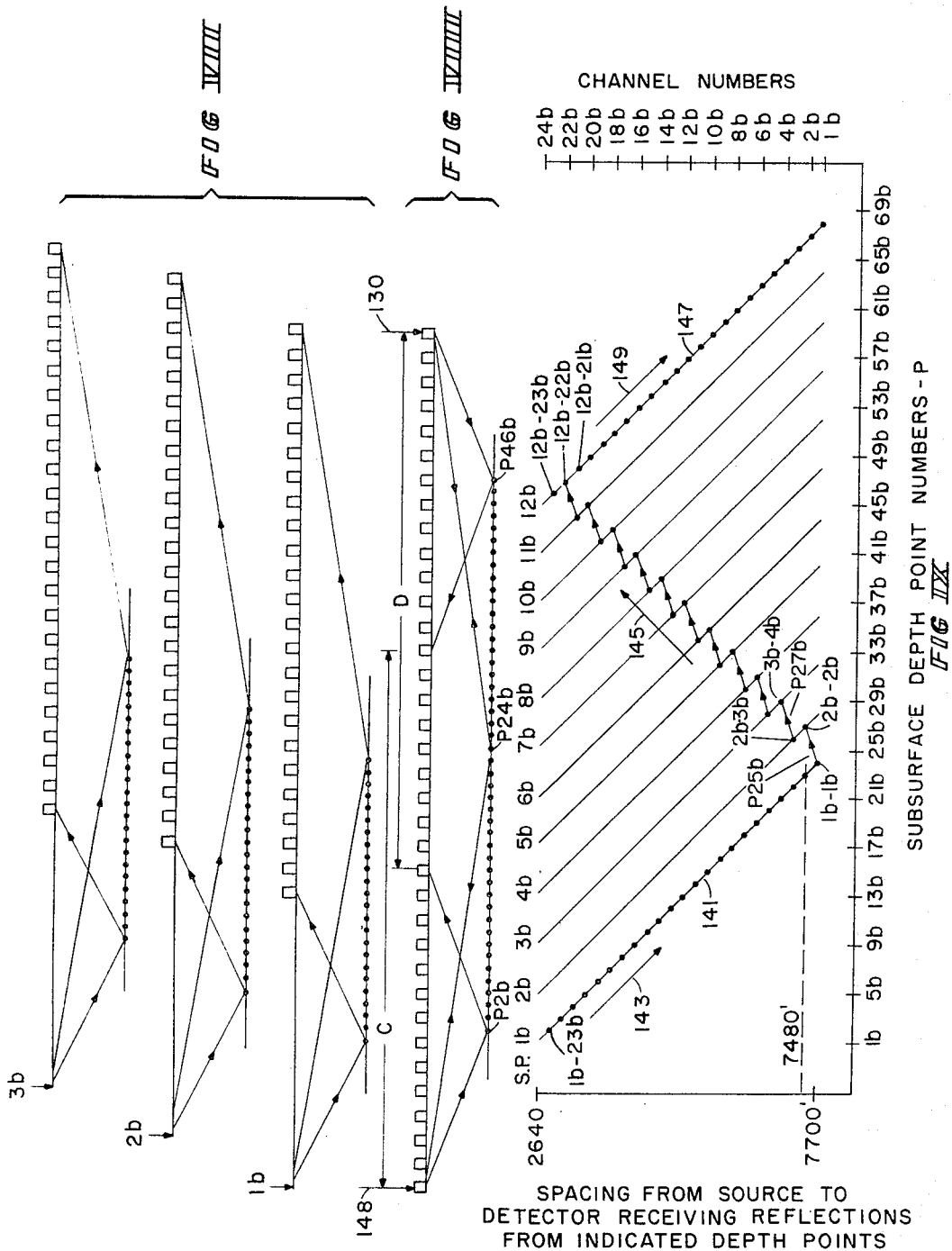

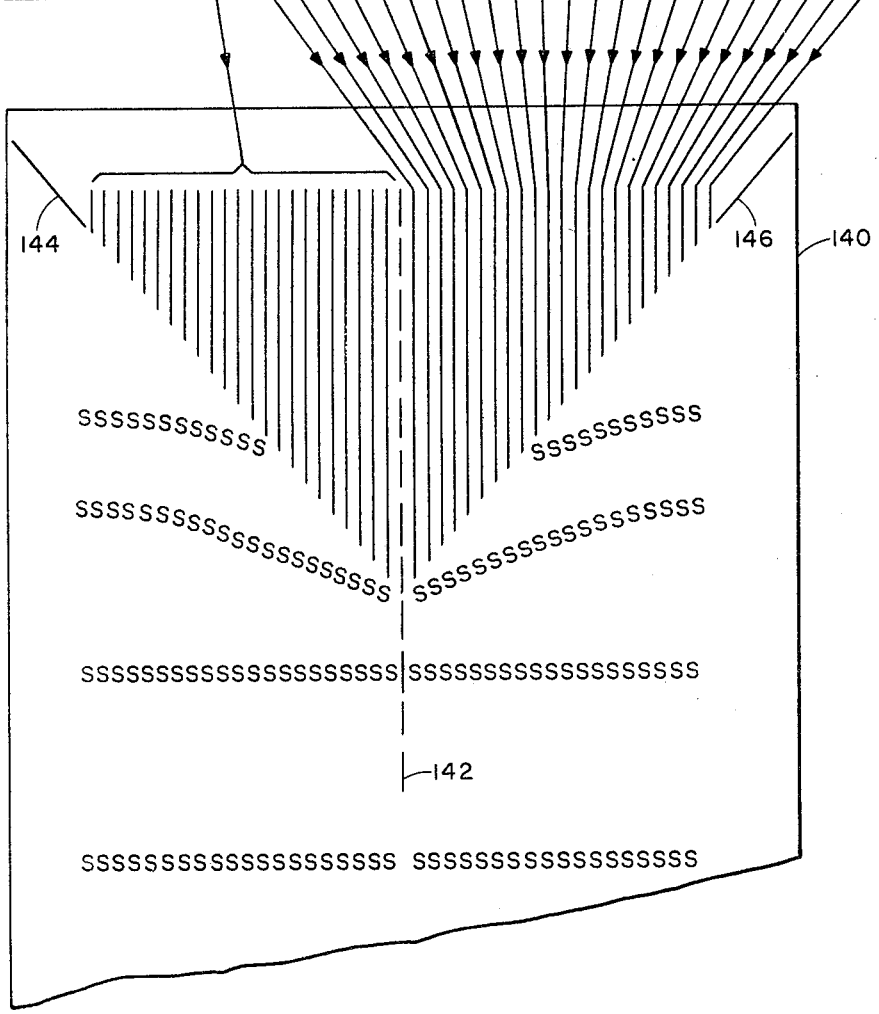
FIG X

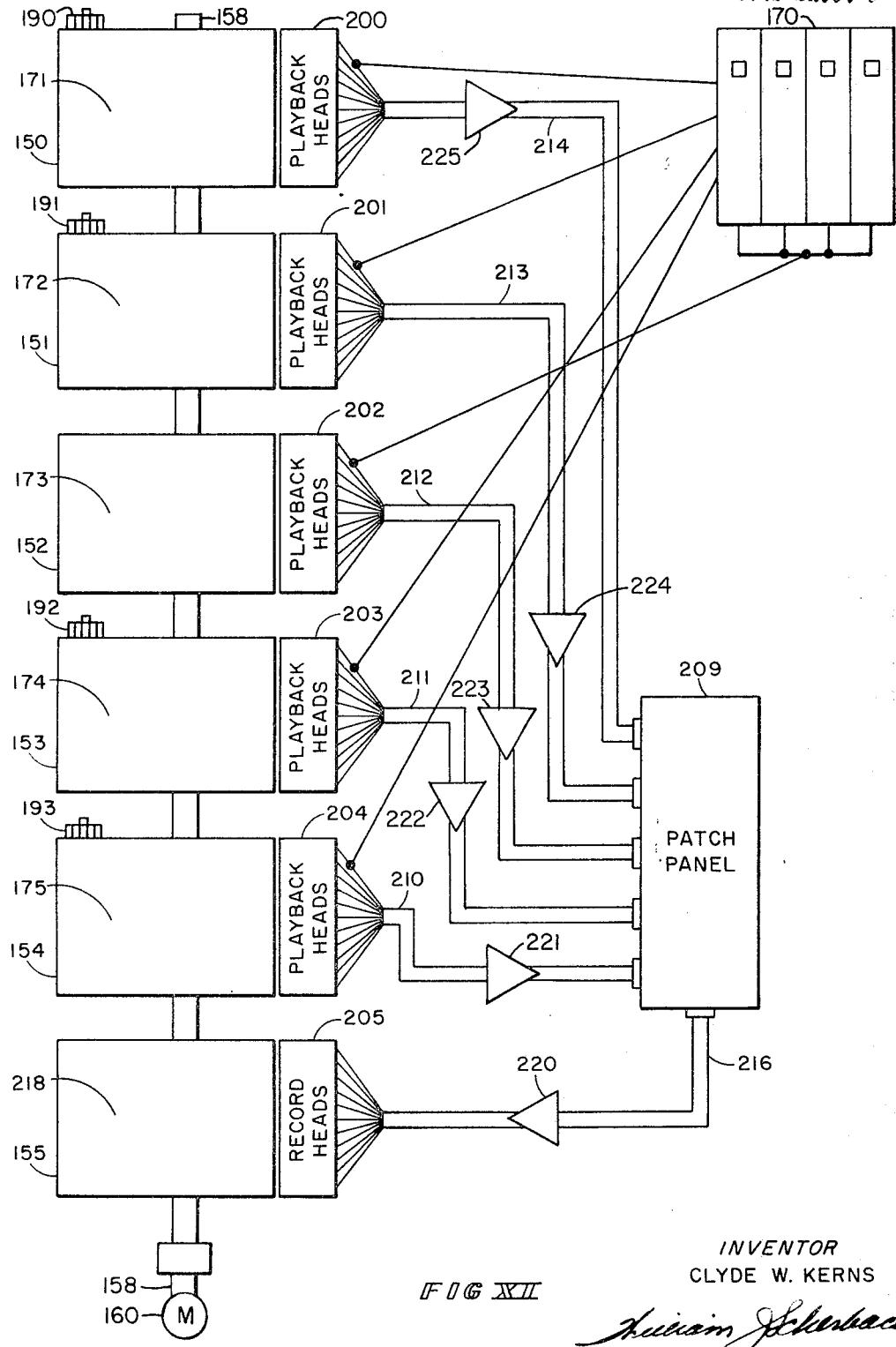
FIG XII

3,353,152
RE-RECORDING SEISMOMETER TRACES OBTAINED FROM THE ROLL ALONG TECHNIQUE TO PRODUCE A SIMULATED BIDIRECTIONAL SEISMIC SURVEY
Clyde W. Kerns, Irving, Tex., assignor to Mobil Oil Corporation, a corporation of New York
Filed Dec. 31, 1964, Ser. No. 422,635
4 Claims. (Cl. 340—15.5)

ABSTRACT OF THE DISCLOSURE

The specification discloses a method of producing a simulated split spread representation from multiple coverage seismic data gathered in the field using the "roll along" technique of shooting. A first group of seismic traces from a single record are recorded in side-by-side relation to form one half of a split spread representation. Then a second group of traces selected from different records resulting from sequential shots is recorded adjacent the first group to simulate the other half of a split spread representation. The traces in the second group are selected and transposed in channel sequence on the basis of shot-detector spacing and reflection point coverage to produce symmetrical "first breaks" with respect to the first group.

Background of the invention
Field of the invention

This invention relates to seismic exploration and, more particularly, to a method of seismic data processing in which a plurality of traces recorded at detector stations receiving energy in one direction are rearranged to simulate a seismogram produced from traces recorded at detector stations receiving energy in the opposite direction.

Description of the prior art

One method of seismic exploration uses the technique of recording several traces representative of information from common reflecting points on subsurface horizons. The traces are obtained by way of a technique, sometimes called the "roll along" method, which involves a detector spread usually composed of twenty-four groups of detectors always receiving energy from the same direction. Since the detector spread receives energy from only one direction, the technique is sometimes called unilateral shooting. A seismic source, either a weight-dropping truck or dynamite, remains at a constant offset distance to the nearest detector station of the spread. A first recording is made with the source and the detector spread in one location. Then, a second recording is made with the source advanced a certain distance and the detectors used for recording advanced a similar distance. By moving the source and the detector spread the equivalent of one detector station spacing between each recording, traces are recorded which cover the same subsurface reflecting point twelve times. If the source and the detector spread move two detector station spacings between each recording, there are six traces representative of the same reflecting point. The type of surveying wherein there are six traces having the same reflecting point is generally known in the art as sixfold coverage. By compositing the channels representative of the same reflecting point, noise and multiple reflections may be attenuated.

One disadvantage of the roll along technique of shooting is that the resulting record sections are in a format such that the adjacent traces give the appearance of receiving information shot in the same direction. Prior to the roll along technique of surveying, other methods, sometimes referred to as bilateral shooting, were used which produced a symmetrical record section giving the appearance of one group of traces being shot in one direction placed adjacent to another group of traces being shot in the opposite direction. These prior techniques of surveying were sometimes called split continuous profiling or skip continuous profiling. In split continuous profiling, a detector spread was placed on either side of a seismic source. The resulting recordings gave the appearance of traces being recorded on either side of a common seismic source. In the skip continuous method, a seismic source shot into a detector spread in one direction gave a first subsurface coverage. Then, by moving the detector spread a certain incremental distance and placing the seismic source on the opposite side of the detector spread, continuous subsurface coverage was obtained. With the skip continuous method of profiling, the resulting record section still gave the appearance of two groups of traces shot from two opposite directions. Thus, the industry engaged in seismic exploration became accustomed to studying record sections composed of groups of traces which were shot in two opposite directions.

Not only has the industry been accustomed to seeing a symmetrical record section, but it is easier to check the accuracy of normal moveout correction applied to a record section when there is a symmetrical record section. The reason for this ease in checking normal moveout is that the traces recorded at detector stations having the same offset distance to the seismic source are placed on either side and equidistant from the center line. An interpreter, when tracing out a particular event on the record, can follow the event continuously across the center line of the record. Furthermore, since the adjacent groups of symmetrical seismograms have an end trace recorded with the same shot-to-detector spacing, an interpreter can follow a particular record event across the entire record section.

A symmetrical-looking record section is further preferred because the interpreter can more easily distinguish between primary reflections and multiple reflections. Finally, since the noise wave on the early portion of a seismogram sometimes obscures shallow reflections, it is easier to trace a shallow reflection on a symmetrical record section.

Summary of the invention

In accordance with the present invention, there is provided a technique in which the traces on a plurality of seismograms recorded from detector stations receiving energy from one direction are rearranged to simulate a single seismogram produced from traces recorded at detector stations receiving energy from the opposite direction.

Further in accordance with the present invention, there is provided a method of rearranging recorded traces on several seismograms to produce a symmetrical-looking seismogram giving the appearance of being shot in two opposite directions.

In another aspect of the present invention, there is established a simulated source point for initiating energy in a direction opposite that to which the originally recorded traces were shot. A first trace representative of reflections received from a first reflecting point on subsurface horizons and originally recorded with a first shot-to-detector spacing is re-recorded on a record section. Adjacent the first trace and in the direction toward the simulated shot point there is recorded a second trace representative of reflections received from a second reflecting point on the subsurface horizon near to the first reflecting point and originally recorded with the next shortest shot-to-detector spacing. Then, there are re-recorded in a direction toward the simulated source point adjacent traces representative of reflecting points on subsurface horizons near to the reflecting point of the preceding trace and originally recorded with a shot-to-detector spacing less than the preceding trace until the desired number of traces are recorded.

In a still further aspect, the invention contemplates a method wherein there are re-recorded adjacent traces representative of reflections received from consecutive adjacent reflecting points on subsurface horizons.

Brief description of the drawings

FIGURE 1 is a sequence of three roll along shooting diagrams providing twelvefold coverage;

FIGURE 2 is a simulated representation of the shooting diagram and the subsurface coverage for a skip continuous method;

FIGURE 3 is a diagram showing the traces to be gathered from the unilaterally shot traces of FIGURE 1 to produce a symmetrical record section;

FIGURE 4 is a representation of the field procedure for roll along shooting with sixfold coverage;

FIGURE 5 is a simulated representation of the shooting diagram and the subsurface coverage with another skip continuous method;

FIGURE 6 is a diagram showing the traces to be gathered from the unilaterally shot traces of FIGURE 4 to produce a symmetrical record section showing coarse density of subsurface points;

FIGURE 7 is a representation of the same field technique as shown in FIGURE 4;

FIGURE 8 is a simulated representation of the shooting diagram and the subsurface coverage with a further skip continuous method;

FIGURE 9 illustrates the diagram for trace gathering to include fine density of subsurface points;

FIGURE 10 is a representation of a seismogram resulting from the practice of the present invention and based upon the diagram of FIGURE 9; and FIGURE 11 illustrates suitable apparatus for seismic channel transposition.

Description of specific embodiments

Referring now to FIGURE 1, there is illustrated a field procedure known as the roll along technique providing twelvefold multiple coverage. For a first recording, a seismic source at shot position 1 initiates wave energy traveling downward by way of ray path 72 to a depth point P1 on reflecting horizon 73, and thence upward to be recorded at a detector station 1-24. Throughout the specification, reference characters identifying detector stations or traces recorded at detector stations give the shot position or shot point number first and then the detector or trace number. The energy from the source at shot point 1 also travels by way of path 74 for reflection from another depth point P24 on reflecting horizon 73 and detection at detector 1—1. A trace recorded at recording station 1—1 includes undulations along its length representative of all the depth points directly above or below depth point P1. Similarly, reflections from all the depth points on horizon 73 are detected by recording stations between 1-24 and 1—1. For a second recording, the source of seismic energy moves up a spacing equivalent to one detector spacing to shot point 2. From shot point 2, the energy is propagated by way of path 78 to be reflected from depth point P3 and recorded at detector station 2-24. The farthest detector station 2-1 receives reflections from depth point P25. As may be seen, the trace recorded from detector station 2-24 is reflected from the same reflecting point P3 as was recorded at detector station 1-23. For a third recording, the source moves to shot position 3 where there is energy propagated downward to delineate a further subsurface 82 for recording on detector spread 83. As may be appreciated, by moving up and recording at every detector spacing, the information from a single subsurface reflecting point will be recorded on twelve separate traces on twelve separate seismograms.

In accordance with the present invention, there is provided a technique of selecting from all the thousands of traces recorded using the roll along technique, the proper traces for placement side-by-side on a seismogram to simulate a seismogram produced from a source of energy propagating energy in a direction opposite to that shown. For a better understanding of the rearrangement of the traces obtained with unilateral shooting, reference is now made to FIGURE 3 along with FIGURE 1. There is shown a grid representation of all the various depth points delineated by the unilateral recording procedure. The depth points delineated by the field setup for shot position 1 of FIGURE 1 are projected down into the grid diagram of FIGURE 3 at a 45° angle. Similarly, all the other depth points delineated from the various shots in the sequence of the roll along technique are projected down into adjacent parallel lines.

Since there is a recorded trace representative of each one of the depth points on the parallel lines of FIGURE 3, these depth points may be thought of and referred to as traces. Along the left-hand vertical axis there is plotted the spacing from the seismic source to the detector station receiving the reflections from the indicated depth points. The recorded traces may then be referred to as having a particular shot-to-detector spacing. Along the right-hand vertical axis are shown the recording channel or trace numbers of the traces representative of the indicated depth points. Along the horizontal axis are shown depth point or reflection point numbers used for reference in the description. All the points on the slanting lines directly above one another represent traces representative of the same reflection point. For example, all the traces on the diagram intersecting dashed line 90 are representative of depth point P25. Trace 1-24 was recorded from a detector station which was spaced 2,640 feet from the source position. Trace 1-1 was recorded at a detector station spaced 7,700 feet from shot position 1. The interspersed traces on line 100 were recorded at detector stations having spacings indicated by the left-hand vertical scale. The grid representation of all the multitudinous traces recorded for various shot positions allows the various traces to be viewed in a dimension of the spacing to the shot positions.

Since recorded seismic traces are routinely normal moveout corrected for the geometrical spacing between the shot position and the detector station, the adjacent traces placed side-by-side on a record section must have shot-to-detector spacings increasing or decreasing in consecutive order. In accordance with the present invention, there is described a method for determining which traces should be placed side-by-side on a record section to simulate traces produced from a detector spread receiving energy propagated from a source in the opposite direction than that from which the traces actually received the energy. If a record section is to be produced showing adjacent traces written from left to right representative of depth points P1 through P70, the following procedure of arrangement should be used to give a symmetrical-looking record. At the left of the record section should be written or recorded trace 1-24. Recorded next to it is trace 1-23. Further traces recorded from shot point 1 should be written on the record section in the order shown by the heavy black dots and following the arrow 104. Finally, when trace 1—1 is recorded, there will be shown the complete seismogram recorded for shot point 1. It should be noted as by the vertical scale that the shot-to-detector spacings of succeeding traces increased from left to right on the record section. After trace 1—1 is written, it is desired to record traces with consecutively spaced depth points but with decreasing shot-to-detector spacings. To provide the semblance of a time tie between sections of the record, trace 1—1 may be written again. Then, there is recorded trace 2—2; then there is recorded trace 3—3. By continuing to record the traces indicated in order by the dots along line 102 and in the direction of arrow 106 from left to right on the record section, there is produced a portion of a record section with a decreasing shot-to-detector spacing. After trace 24—24 is recorded, it may be recorded again to simulate a time tie for the succeeding portion of the record. Adjacent the second reproduction of trace 24—24 there is placed trace 24–23. The sequence of writing traces continues in the order of the dots shown along line 108 and in the direction of arrow 109.

The physical significance of the order of arranging traces on a record section as described in conjunction with FIGURE 3 may be seen by reference to FIGURE 2. By gathering traces in the order described, there is represented on one portion of a symmetrical record the subsurface depth points P1 through P47. The direct analogy of a field setup which apparently produced the symmetrical record section described for FIGURE 3 is a skip continuous field setup. With a seismic source at shot point 84, the subsurface depth points P1 through P24 are delineated and recorded at detector spread B. It is noted that the setup for shot position 84 is exactly the same as the subsurface coverage and the positions of the detectors and shot points for shot position 1 (FIGURE 1). The depth points P24 through P47 are delineated by energy traveling from a simulated shot position 86 and recorded at detector spread A. It may be seen that shot position 84 and shot position 86 have in common the depth point 24. The ray paths 113 and 114 are the same for each shot position. As in the formerly used skip continuous method, a common subsurface point between skip continuous coverages provides a time tie between the two adjacent seismograms.

Each and every subsurface depth point P24 through P47 as delineated by simulated shot position 86 was recorded on one of the traces obtained with the roll along technique with the proper shot-to-detector distance. For instance, depth point P26 for the simulated skip continuous setup of FIGURE 3 was apparently delineated by a seismic source at 86, sending wave energy by way of ray path 116 to be reflected by depth point P26 and recorded at detector station 86–3. The same depth point P26 was covered by shot position 3 of FIGURE 1. Energy applied to the earth at shot position 3 and traveling by way of ray paths 117 and 119 was received at detector 3—3. The horizontal spacing between shot position 3 and trace 3—3 is the same as the horizontal spacing between simulated trace 86–3 and simulated shot point 86. Using the theory of reciprocity, the subsurface depth points P24 through P47 of FIGURE 2 may be represented on a record section as if the ray paths delineating them propagated in the opposite direction than that in which they actually traveled. The source and the detector may be interchanged in position and still delineate the same reflection point and receive the same wave energy.

It is apparent that other methods of choosing the gathered traces to simulate a symmetrical seismogram may be selected. The important principle to be remembered in gathering traces is that the shot-to-detector spacing for adjacent traces must differ by an incremental amount and in the same direction. For example, again referring to FIGURES 2 and 3, if a record section is being written from right to left, the traces beginning with 24—24 should be written with an increasing shot-to-detector spacing. For records obtained with twelvefold coverage, the adjacent traces on a record section are representative of consecutively spaced subsurface points. The adjacent traces have a shot-to-detector spacing differing by the same incremental amount. If traces are gathered in a direction away from simulated shot position 86, the shot-to-detector spacing should increase by the same amount between each adjacent trace.

Further, it is apparent that traces 1—1 and 24—24 do not have to be written twice unless it is desirable to simulate a record produced by skip continuous profiling. If traces 1—1 and 24—24 are not written twice, the gathered traces comprise only twenty-three traces. One omitted trace on a large record section makes little difference in appearance.

In the discussion of twelvefold coverage with reference to FIGURE 3, the gathered traces were selected from a high density of traces with different shot-to-detector spacings and representative of different subsurface depth points. When sixfold coverage is used, however, the density of traces is coarser. In FIGURE 4, the source and the detectors used for recording are shown to move up a spacing equal to two detector station spacings between each recording. With the seismic source at shot position 1$a$, depth points P1$a$ through P25$a$ are delineated and recorded at detector spread 125. With the source moved up two detector station spacings and now at shot position 2$a$, depth points P4$a$ through P29$a$ are delineated and recorded at detector spread 126. For a third recording, the source is at shot position 3$a$ and depth points P8$a$ through P33$a$ are delineated by detector spread 127. The sequence of the roll along shootings continues along a traverse with field setups not shown.

Each of the depth points represented by the traces recorded in field setups as illustrated by FIGURE 4 is projected down into the grid diagram of FIGURE 6. As before, the subsurface points delineated by each of the roll along shots are represented by one of a set of parallel lines at 45° angles. As aforementioned also, each of the depth points on the grid diagram may be thought of as an individual trace. It may be seen that the density of subsurface coverage is not as great as that obtained with twelve-fold coverage. For example, the traces along line of dots 131 do not represent every depth point. Only every other depth point is represented on the traces. For example, there is no trace representative of reflections from depth point P25$a$ with the correct spacing from source to detector. For depth point P25$a$ there is needed a trace recorded at a detector station spaced 7,480 feet from the source. Similarly, a trace representative of reflections from depth point P28$a$ is desired but there is no recorded trace with the proper shot-to-detector spacing. For a simple record then, there may be produced a simulated record section with decreasing shot-to-detector spacing by recording the traces along line 131. To make a symmetrical-looking record section, it is desirable then to record only every other trace obtained from the seismogram produced from shot position 1$a$. In writing from left to right the traces on a record section trace 1$a$–23$a$ is first recorded. Then there is recorded trace 1$a$–21$a$. The remainder of the traces along line 118 are recorded in adjacent order in the direction shown by arrow 132. After trace 1$a$—1$a$ is recorded, it may be recorded again to simulate a time tie between records.

The next trace recorded is trace 2$a$–3$a$. Then the remainder of the traces in adjacent and consecutive order along line 131 and in the direction of arrow 132 are recorded. After trace 12$a$–23$a$ is recorded, it may be recorded again to simulate a further time tie between the next record. Then there is recorded trace 12$a$–21$a$. The process of gathering traces continues to produce a symmetrical record section.

The physical significance of gathering traces in the process described in conjunction with FIGURE 6 is illustrated by the skip continuous field diagram of FIGURE 5. Since only every other depth point is represented on the produced record section, the analogous field situation is a first seismic source at 112 delineating subsurface points P2$a$ through P24$a$ and recording them at detector spread F, indicated by the black detectors and having only twelve detector stations. The analogous field representation of the coverage of depth points P24$a$ through P47$a$ is given by a simulated seismic source at shot position 110 and a detector spread E, indicated by the twelve white detector stations. The field setup for shot position 112 was the one actually used for shot point 1$a$ of FIGURE 4. The traces recorded by the simulated detector spread E may be reconstructed by selecting traces recorded from the roll along shooting and recording of FIGURE 4.

By recording traces representative of only every other subsurface depth point, some degree of information is lost on the record section. Using the diagram of trace gathering of FIGURE 9, it is possible to fill in traces representative of depth points which were not actually recorded with the unilateral shooting. The density of subsurface coverage may be increased. In accordance with the present invention, a record section may be constructed giving the appearance of having been shot with the skip continuous field diagram of FIGURE 8. Referring now to FIGURE 9, there is first recorded at the left-hand side of a record section trace $1b$–$23b$. The remainder of the traces along line 141 and in the direction of arrow 143 are then recorded in adjacent and consecutive order from left to right on the record section. After trace $1b$—$1b$ is recorded, it may be recorded again to simulate a time tie. Next, it is desirable to record a trace representative of depth point P25$b$ recorded at a detector station spaced 7,480 feet from the source. Since there is no trace representative of depth point P25$b$ with the proper shot-to-detector spacing, a trace representative of a nearby depth point with the correct shot-to-detector spacing may be put in the place of the trace for depth point P25$b$.

In a preferred embodiment, trace $2b$—$2b$ is recorded in the place of a trace representative of depth point P25$b$. Next there is recorded trace $2b$–$3b$. Since there is no trace representative of depth point P27$b$ with the correct shot-to-detector spacing, trace $3b$–$4b$ is recorded in its place. The sequence of rearranging the traces continues in the order shown by the small arrows and in the general direction of arrow 145 from left to right on a record section. After trace $12b$–$22b$ is recorded, then there is recorded to its right trace $12b$–$23b$. To simulate a time tie, trace $12b$–$23b$ is recorded again. Then there is recorded again trace $12b$–$22b$; then there is recorded trace $12b$–$21b$. The sequence of gathering traces continues from left to right on the record section by following arrow 149 to gather traces along line 147.

The analogous field setup for the procedure of gathering traces as described in FIGURE 9 is shown in FIGURE 8. With a simulated source at 130, depth points P24$b$ through P46$b$ are delineated by detector spread C. It should be noted that there are only twenty-three detectors in spread C. This number of detectors is by reason of the fact that there can be only twenty-three traces recorded in a given direction if there is to be continuous subsurface coverage. The depth points $2b$ through $24b$ were analogously delineated by a shot at simulated shot position 148 shooting into a spread D, having twenty-three detectors.

It is apparent that there are other available traces which could have been substituted in the gaps of the simulated direction of gathering along arrow 145 in FIGURE 9. In gathering the simulated traces, it is important that a trace have the proper shot-to-detector spacing. Any nearby depth point trace may be substituted if it has the proper shot-to-detector spacing. Further, it is readily apparent that depending upon whether the record section is being written from left to right or right to left, the direction of gathering traces proceeds toward or away from a simulated source point.

A portion of an example record section representative of depth points P2$b$ through P46$b$ of FIGURE 8 and gathered to give an appearance of a bidirectional record section is shown in FIGURE 10. The Table 132 indicates which traces are to be placed adjacent to one another in the seismogram 140. The arrows indicate how the traces are rearranged to produce the symmetrical seismogram 140. Following the schedule of the arrangement of traces as in Table 132, a symmetrical record is produced giving the appearance of having been shot using the field procedure indicated in FIGURE 8.

In FIGURE 10, the traces equidistant on either side from center line 142 were recorded at detector stations progressively less in distance from source to detector. Thus the line-up of first breaks 144 slants in the opposite direction from the line-up of first breaks 146.

Now that it has been explained how to rearrange traces obtained with unilateral shooting to give the appearance of a bidiretcional record section, it will now be explained the operation of an apparatus for transposing the traces on the various separate seismograms to produce a record section. In FIGURE 11, six drums 150–155 are shown to be mounted on a common shaft 158. Each of the drums 150–155 is rotated on shaft 158 at a uniform speed by motor 160. Separate magnetic tapes 171, 172, 174, and 175 representative of the individual recordings made from the unilateral shooting are placed on playback drums 150–154. A transfer tape is placed on recording drum 155.

More particularly, the magnetic tapes on drums 150–154 are first aligned with a common time reference. A four-channel counter 170 samples the time break channel on each of the magnetic tapes 171, 172, 174, and 175. By comparing the time difference between the time breaks from the time break channel on magnetic tapes 171, 172, 174, and 175 with the time break on the reference time break channel on the magnetic tape 173 located on the center drum 152, each channel of counter 170 gives a visual indication of the amount of time difference between the seismograms relative to the reference time indicated by the time break channel on tape 173. By adjusting knobs 190–193, each drum may be rotated an amount to align the respective time break channels. Ordinarily, an alignment within one millisecond of the reference time break is desirable.

Once the time break channels on the magnetic tapes 171–175 are aligned, the traces recorded in magnetic form on each one of the magnetic tapes are sensed by playback heads 200–204. Electrical signals representative of the various magnetic traces are transferred to a patch panel 209 by way of multiconductor cables 210–214. In patch panel 209, the various channels are rearranged in accordance with the preceding teachings about regrouping channels to give a simulated representation of a bidirectional record section. The channels in rearranged order are transmitted then to recording heads 205 by way of multiconductor cable 216 for recording as adjacent traces on magnetic tape 218 located on recording drum 155. Multichannel amplifiers 220–225 amplify the electrical signals in the respective channels sufficiently for transferring the traces from magnetic tapes 171–175 to be re-recorded as traces on magnetic tape 218.

Apparatus similar to that described above is also described in U.S. Patent No. 3,181,643, issued May 4, 1965, to Gilbert W. Ehlert, Albert W. Musgrave, Paul E. Nash, and Roderick M. Nugent, co-workers of mine. An improved method and apparatus of aligning the seismograms in time are described and claimed in U.S. Patent No. 3,206,720, issued Sept. 14, 1965, to Robert B. Kerr, another co-worker of mine.

With knowledge of the foregoing teachings of regrouping traces obtained from unilateral field techniques to simulate a symmetrical record section, it may become apparent to those skilled in the art that there are other modifications of regrouping the various traces. It is intended to cover those modifications that fall within the scope of the appended claims.

What is claimed is:

1. In seismic exploration wherein a linear spread of detectors and a seismic source offset from the same end thereof are operated to produce a plurality of multitrace records representative of overlapping coverage of reflection points on subsurface horizons, each multitrace record resulting from a separate actuation of said seismic source, the method comprising the steps of:

(a) re-recording a first group of traces from a first of said records in sequential order of linearly varying source-detector distances, said first group of traces being representative of reflection points on a first segment of a subsurface horizon, and (b) re-recording a second group of traces in side-by-side relation on one side of said first group of traces, said second group of traces being selected from different ones of said records to represent a second segment on said one side of said subsurface horizon, said re-recording of said second group of traces including:

(1) re-recording a first trace to one side of an end trace of said first group, said first trace having substantially the same source-detector distance as a trace in said first group, said first trace representing a reflection point on said second segment and next to a reflection point represented by said end trace, (2) re-recording a second trace adjacent said first trace, said second trace having substantially the same source-detector distance as another trace in said first group, said second trace representing a reflection point on said second segment and next to said reflection point represented by said first trace, and (3) continuing to re-record adjacent traces in a sequence such that each trace has substantially the same source-detector distance as a trace in said first group, whereby there is produced a simulated split spread seismogram representative of singlefold subsurface coverage.

2. The method of claim 1 wherein said second group of traces are re-recorded sequentially.

3. The method of claim 1 wherein said second group of traces are re-recorded simultaneously.

4. The method of producing a split spreadlike representation of seismic data originally recorded in the field employing the technique of maintaining the seismic source at a constant offset distance to one end of a spread of detectors for each application of seismic energy to the earth at uniformly spaced points along a traverse, said method comprising the steps of:

(a) re-recording in side-by-side format a first group of seismic traces resulting from one application of seismic energy to the earth, (b) re-recording a first trace to one side of an end trace of said group, said first trace being selected from a group of traces other than said first group of traces and resulting from the reflection of seismic energy from a depth point different from the depth points giving rise to reflections appearing on the traces of said first group, (c) re-recording a second trace adjacent said first trace, said second trace being selected from a group of traces other than said first group and resulting from a depth point different from the depth points giving rise to said first group of traces and being adjacent the depth point giving rise to said first trace, (d) re-recording a third trace adjacent said second trace, said third trace including a reflection of seismic energy resulting from a depth point different from the depth points giving rise to said first group of traces or said first trace and being adjacent the depth point giving rise to said second trace, and (e) continuing to re-record adjacent traces, said adjacent traces including a reflection of seismic energy resulting from a depth point different from the depth point giving rise to any of the preceding traces and being adjacent the depth point giving rise to the immediately preceding trace.

References Cited

UNITED STATES PATENTS

| | | | |
|---|---|---|---|
| 2,153,920 | 4/1939 | Gardner | 181—0.5 |
| 2,988,729 | 6/1961 | Musgrave | 340—15.5 |
| 3,096,846 | 7/1963 | Savit et al. | 181—0.5 |
| 3,105,568 | 10/1963 | Jolly | 340—15.5 X |
| 3,181,643 | 5/1965 | Ehlert et al. | 340—15.5 X |
| 3,213,411 | 10/1965 | Loring | 340—15.5 |
| 3,217,828 | 11/1965 | Mendenhall et al. | 181—0.5 |

RODNEY D. BENNETT, *Primary Examiner.*

BENJAMIN A. BORCHELT, *Examiner.*

M. F. HUBLER, *Assistant Examiner.*